UNITED STATES PATENT OFFICE.

THEODOR COHN, OF BERLIN, GERMANY.

COMPOUND FOR PREVENTING OXIDATION.

SPECIFICATION forming part of Letters Patent No. 532,640, dated January 15, 1895.

Application filed November 2, 1893. Serial No. 489,858. (No specimens.)

*To all whom it may concern:*

Be it known that I, THEODOR COHN, manufacturer, of 70 Cottbuserdamm, Berlin, and Badenburger Mill, near Giessen, in the Kingdom of Prussia and German Empire, have invented a useful and new Compound for Preventing Oxidizing and for Similar Purposes, of which the following is a specification.

The present invention relates to a new or improved protective paint, which, on account of its great lightness and of its yielding character, remains elastic for a considerable time and is therefore not easily affected by the expansions and contractions of the material to which it is applied, caused by variations of temperature, and consequently cracks, which would destroy the utility of the protective paint, cannot occur. Another advantage of the protective paint is that the latter, under certain conditions, deposits an oily layer on the inner side of the coat of the paint, i. e., on the surface which it is intended to protect by the paint. This layer, to a considerable extent, increases the efficiency of the protective paint.

The improved protective paint consists mainly of oxide of lead, common salt, and of a soluble salt of a suitable heavy metal, the whole being stirred up with a little water and washed and finally ground with oils or varnish.

The effect of this paint may be explained by the following statement: The oxide of lead combines with the common salt and forms chloride of lead and hydrate of soda. The latter precipitates the oxides or the hydrates of the heavy metallic salts and thereby forms, with the fatty acids contained in the oils or varnish, saponaceous products. The latter products become dissolved in the free oil and give the paint its elasticity.

In practice I prefer to use the following materials combined in the proportions by weight stated:—Ten parts of oxide of lead are mixed with two parts of common salt and stirred up with enough water to form a thin paste. During the grinding or afterward, a predetermined quantity of chloride or sulphate of zinc is added and the whole washed with water, after which the product is directly (without previously drying it) ground up with oils or varnish into the proper consistency for painting.

To produce various colored paints the before named salts of zinc may be replaced by other soluble salts, such as salts of copper, iron, chrome, manganese, cobalt or nickel, according to the tint desired. In this manner the copper produces a green, the chrome a gray-green, and the manganese a brown tint.

The proportions of the materials to be used depend on the nature of the latter and the proportion of oxide of lead to common salt may be varied according to requirements.

The paint may be applied to all kinds of material, but it is especially suited for protecting metals and wood.

What I claim, and desire to secure by Letters Patent of the United States, is—

An improved paint consisting of basic chloride of lead, sulphate of sodium and hydroxide of copper, substantially as described.

In witness whereof I have hereunto set my hand in presence of two witnesses.

THEODOR COHN.

Witnesses:
   WILLIAM PATAKY,
   PAUL FISCHER.